US008229063B2

(12) United States Patent
Nishii

(10) Patent No.: US 8,229,063 B2
(45) Date of Patent: Jul. 24, 2012

(54) X-RAY IMAGE RECEPTION SYSTEM

(75) Inventor: Yuichi Nishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 378 days.

(21) Appl. No.: 12/572,256

(22) Filed: Oct. 1, 2009

(65) Prior Publication Data

US 2010/0088593 A1   Apr. 8, 2010

(30) Foreign Application Priority Data

Oct. 2, 2008   (JP) .................................. 2008-257313

(51) Int. Cl.
*G01N 23/223* (2006.01)
(52) U.S. Cl. ............................... 378/44; 378/62; 378/19
(58) Field of Classification Search .................... 378/19, 378/44, 62, 98.8; 382/128–132
See application file for complete search history.

(56) References Cited

FOREIGN PATENT DOCUMENTS

JP   2004-350300 A   12/2004

*Primary Examiner* — Courtney Thomas
(74) *Attorney, Agent, or Firm* — Canon USA, Inc., IP Division

(57) ABSTRACT

When a reception unit in an X-ray image reception system receives an image and additional information for the image from an X-ray image transmission system, the received additional information is sent to a resend setting determination unit. The resend setting determination unit determines a resend setting based on the received additional information and information acquired from a database and transmits the result to a reception completion determination unit. A packet loss determination unit determines packet loss in data received from the reception unit and transmits the result to the reception completion determination unit. The reception determination completion unit sends the results to the resent setting determination unit and the packet loss determination unit to the resend request unit. The resend request unit sends a resend request to the X-ray image transmission system based on the information from the reception unit and the result determined by the reception completion determination unit.

12 Claims, 16 Drawing Sheets

FIG.8

| IMAGING AREA ID | IMAGING AREA NAME | RESEND NUMBER | RESEND REQUEST TIMING |
|---|---|---|---|
| 0001 | TORSO | 20 | EVERY 300 PACKETS |
| 0002 | ABDOMEN | 20 | EVERY 300 PACKETS |
| 0003 | CARDIOVASCULAR | 0 | NONE |
| 0004 | BONE | 50 | EVERY 500 PACKETS |
| 0005 | LOWER EXTREMITY | 10 | EVERY 100 PACKETS |
| 0006 | HEAD | 10 | EVERY 100 PACKETS |

FIG.9

| IMAGING METHOD ID | IMAGING METHOD NAME | RESEND TIME (ms) |
|---|---|---|
| 0001 | FLUOROSCOPY | 0 |
| 0002 | CINERADIOGRAPHY | 1000 |
| 0003 | STILL IMAGING | 2000 |
| 0004 | DSA IMAGING | 1000 |
| 0005 | ROADMAP IMAGING | 0 |

FIG.10A

| IMAGING METHOD ID | PACKET NUMBER | RESEND TIME (ms) | RESEND REQUEST TIMING |
|---|---|---|---|
| 0001 | 0 | 999999 | EVERY PACKET |
| 0001 | OTHER THAN 1 | 0 | NONE |
| 0002 | 0 | 999999 | EVERY PACKET |
| 0002 | OTHER THAN 1 | 1000 | EVERY 300 PACKETS |
| 0003 | 0 | 999999 | EVERY PACKET |
| 0003 | OTHER THAN 1 | 2000 | EVERY 300 PACKETS |
| 0004 | 0 | 999999 | EVERY PACKET |
| 0004 | OTHER THAN 1 | 1000 | EVERY 300 PACKETS |
| 0005 | 0 | 999999 | EVERY PACKET |
| 0005 | OTHER THAN 1 | 0 | NONE |

FIG.10B

| IMAGING METHOD ID | IMAGING METHOD NAME |
|---|---|
| 0001 | FLUOROSCOPY |
| 0002 | CINERADIOGRAPHY |
| 0003 | STILL IMAGING |
| 0004 | DSA IMAGING |
| 0005 | ROADMAP IMAGING |

FIG.11A

| IMAGING METHOD ID | IMAGING METHOD NAME | IMAGE AUTOMATIC PRINTING SETTING | IMAGE AUTOMATIC STORAGE SETTING |
|---|---|---|---|
| 0001 | FLUOROSCOPY | 0 | 0 |
| 0002 | CINERADIOGRAPHY | 0 | 1 |
| 0003 | STILL IMAGING | 1 | 1 |
| 0004 | DSA IMAGING | 1 | 1 |
| 0005 | ROADMAP IMAGING | 0 | 0 |

FIG.11B

| IMAGE AUTOMATIC PRINTING SETTING | IMAGE AUTOMATIC STORAGE SETTING | RESEND NUMBER |
|---|---|---|
| 1 | 1 | 30 |
| 1 | 0 | 15 |
| 0 | 1 | 15 |
| 0 | 0 | 0 |

FIG.12A

| IMAGING METHOD ID | IMAGE AUTOMATIC PRINTING SETTING | RESEND NUMBER |
|---|---|---|
| 0001 | 1 | 0 |
| 0001 | 0 | 0 |
| 0002 | 1 | 30 |
| 0002 | 0 | 15 |
| 0003 | 1 | 60 |
| 0003 | 0 | 30 |
| 0004 | 1 | 30 |
| 0004 | 0 | 15 |
| 0005 | 1 | 0 |
| 0005 | 0 | 0 |

FIG.12B

| IMAGING METHOD ID | IMAGING METHOD NAME |
|---|---|
| 0001 | FLUOROSCOPY |
| 0002 | CINERADIOGRAPHY |
| 0003 | STILL IMAGING |
| 0004 | DSA IMAGING |
| 0005 | ROADMAP IMAGING |

FIG.13A

| IMAGING METHOD ID | IMAGING END IMAGE | RESEND NUMBER |
|---|---|---|
| 0001 | 1 | 30 |
| 0001 | 0 | 0 |
| 0002 | 1 | 30 |
| 0002 | 0 | 15 |
| 0003 | 1 | 30 |
| 0003 | 0 | 30 |
| 0004 | 1 | 30 |
| 0004 | 0 | 15 |
| 0005 | 1 | 30 |
| 0005 | 0 | 0 |

FIG.13B

| IMAGING METHOD ID | IMAGING METHOD NAME |
|---|---|
| 0001 | FLUOROSCOPY |
| 0002 | CINERADIOGRAPHY |
| 0003 | STILL IMAGING |
| 0004 | DSA IMAGING |
| 0005 | ROADMAP IMAGING |

FIG.14A

| IMAGING METHOD ID | IMAGE NUMBER | RESEND NUMBER |
|---|---|---|
| 0001 | 0 OR MORE | 0 |
| 0002 | 0 OR MORE | 15 |
| 0003 | 0 OR MORE | 30 |
| 0004 | 0 - 2 | 30 |
| 0004 | 3 OR MORE | 15 |
| 0005 | 0 - 2 | 30 |
| 0005 | 3 OR MORE | 0 |

FIG.14B

| IMAGING METHOD ID | IMAGING METHOD NAME |
|---|---|
| 0001 | FLUOROSCOPY |
| 0002 | CINERADIOGRAPHY |
| 0003 | STILL IMAGING |
| 0004 | DSA IMAGING |
| 0005 | ROADMAP IMAGING |

FIG.15A

| IMAGING SITE ID | IMAGING METHOD ID | PACKET NUMBER | RESEND TIME (ms) | RESEND REQUEST TIMING |
|---|---|---|---|---|
| 0001 | 0001 | 0 | 999999 | EVERY PACKET |
| 0001 | 0001 | OTHER THAN 1 | 0 | NONE |
| 0001 | 0002 | 0 | 999999 | EVERY PACKET |
| 0001 | 0002 | OTHER THAN 1 | 1000 | EVERY 300 PACKETS |
| 0001 | 0003 | 0 | 999999 | EVERY PACKET |
| 0001 | 0003 | OTHER THAN 1 | 2000 | EVERY 300 PACKETS |
| 0001 | 0004 | 0 | 999999 | EVERY PACKET |
| 0001 | 0004 | OTHER THAN 1 | 1000 | EVERY 300 PACKETS |
| 0001 | 0005 | 0 | 999999 | EVERY PACKET |
| 0001 | 0005 | OTHER THAN 1 | 0 | NONE |
| 0002 | 0001 | 0 | 999999 | EVERY PACKET |
| 0002 | 0001 | OTHER THAN 1 | 0 | NONE |
| 0002 | 0002 | 0 | 999999 | EVERY PACKET |
| 0002 | 0002 | OTHER THAN 1 | 1000 | EVERY 300 PACKETS |
| 0002 | 0003 | 0 | 999999 | EVERY PACKET |
| 0002 | 0003 | OTHER THAN 1 | 2000 | EVERY 300 PACKETS |
| 0002 | 0004 | 0 | 999999 | EVERY PACKET |
| 0002 | 0004 | OTHER THAN 1 | 1000 | EVERY 300 PACKETS |
| 0002 | 0005 | 0 | 999999 | EVERY PACKET |
| 0002 | 0005 | OTHER THAN 1 | 0 | NONE |

FIG.15B

| IMAGING AREA ID | IMAGING AREA NAME |
|---|---|
| 0001 | TORSO |
| 0002 | ABDOMEN |
| 0003 | CARDIOVASCULAR |
| 0004 | BONE |
| 0005 | LOWER EXTREMITY |
| 0006 | HEAD |

FIG.15C

| IMAGING METHOD ID | IMAGING METHOD NAME |
|---|---|
| 0001 | FLUOROSCOPY |
| 0002 | CINERADIOGRAPHY |
| 0003 | STILL IMAGING |
| 0004 | DSA IMAGING |
| 0005 | ROADMAP IMAGING |

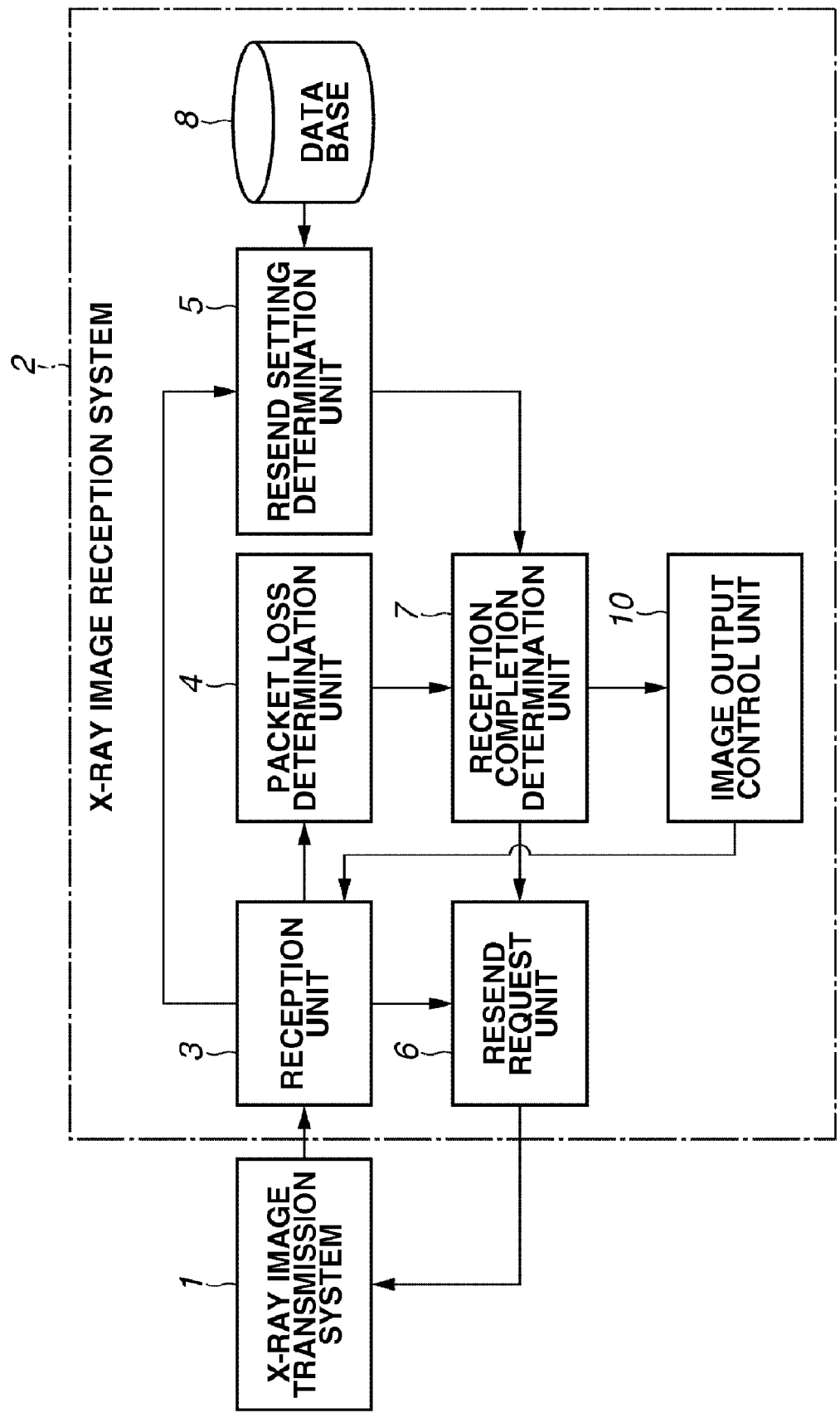

X-RAY IMAGE RECEPTION SYSTEM

BACKGROUND OF THE INVENTION

1. Field of the Invention

The present invention relates to an X-ray image reception system executing a resend process in the event of packet loss when using a packet communication network to connect an X-ray imaging device and a display control device. The resend process is executed based on a resend setting determined based on conditions such as an imaging area or an operating method.

2. Description of the Related Art

Generally, an X-ray fluoroscopic imaging apparatus, which performs fluoroscopic imaging in real time for a purpose such as interventional radiology (IVR), includes an X-ray imaging device and a display control device.

In conventional X-ray imaging devices, an analog camera tube or a charge-coupled device (CCD) is connected to an image intensifier and analog data is transmitted to a display control device by video signals for analog display on a monitor.

However, recent advances in the digitalizing of X-ray imaging devices have enabled use of a flat panel sensor (FPD) instead of the analog camera tube or CCD connected to an image intensifier.

In addition, such digitalized systems have been adapted to enable display on a high-resolution monitor via a digital visual interface (DVI) thus enabling construction of a fully digitalized system from imaging to display.

Such a fully digitalized system may use a packet communication network to promote wireless operation, general versatility or compactness of transmission wiring. "Network communication" means communication in which data is separated into small units, and sent or received individually. A piece of separated data is called a "packet".

A protocol, which can resend data securely, such as Transmission Control Protocol (TCP) is used to send data to the display control device when using a packet communication network. However there are difficulties in increasing the resend data rate due to resend processing.

TCP is a standard internet-based protocol, which forms a reliable connection between the sending-host and the receiving-host processes, to execute resend in the event of data loss. Although TCP is very reliable, its associated transfer efficiency is low. TCP causes large delay in packet arrival resulting in failure of real-time display.

As a result, a User Datagram Protocol (UDP) has been used to reduce delay and enables high-speed transmission. However, UDP entails the risk of packet loss due to the absence of a connection establishment and the transmission of confirmatory responses.

UDP is a standard internet-based protocol, which executes connectionless communication by only sending and receiving data between applications. Its reliability depends on the application. Although UDP has low reliability, its transfer efficiency is high.

Methods including Real-Time Transport Protocol (RTP), which is positioned in a layer above UDP, have been proposed as solutions to the above problems.

An X-ray fluoroscopic imaging apparatus uses an imaging method termed "fluoroscopy" in which a moving image is captured by using low-level X-ray irradiation and the resulting image is not stored, and an imaging method termed "cineradiography" in which a moving image is captured by using high-level X-ray irradiation and the resulting image is stored.

Other imaging methods include a single still image captured using high-level X-ray irradiation, and ROADMAP or Digital Subtraction Angiography (DSA) in which a mask image composed of an average of the first several images is prepared in advance and imaging is executed by using differences of subsequent images with the mask image. Such imaging methods have been applied to various imaging areas including the torso, abdomen, cardiovascular system or the extremities.

Japanese Patent Application Laid open No. 2004-350300 discusses a method in which an error correction method for decoding a compressed image is switched depending on the imaging mode.

However, when packet loss has occurred in sent image data, unique determination of the resend processing of an image is not possible due to the different handling of images during display, storage, printing or transfer after image capture for each of the various imaging areas and imaging methods described above.

SUMMARY OF THE INVENTION

The present invention is directed to an X-ray image reception system in which an X-ray imaging device and a display control device are connected by a packet communication network and which performs a resend process in the event of packet loss based on a resend setting determined based on conditions such as an imaging area or an operating method.

According to an aspect of the present invention, an X-ray image reception system forms part of an X-ray fluoroscopic imaging apparatus. The X-ray fluoroscopic imaging apparatus uses a packet communication network to connect an X-ray imaging device having an X-ray transmission system with an X-ray image display device having the X-ray image reception system and enables imaging both at a plurality of imaging areas and using a plurality of imaging methods. The X-ray image reception system includes a reception unit receiving an image sent in packets and incidental information for the image, a packet loss determination unit determining packet loss in the image or in the incidental information for the image, a resend setting determination unit determining resend setting from the incidental information for the image and from system setting information for the image, a reception completion determination unit determining reception completion of the image and the incidental information for the image from information from the packet loss determination unit and the resend setting determination unit, and a resend request unit producing resend requests until reception of a notification from the reception completion determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a numerical example of a first example of a database.

FIG. 9 is a numerical example of a second example of a database.

FIGS. 10A and 10B are numerical examples of a third example of a database.

FIGS. 11A and 11B are numerical examples of a fourth example of a database.

FIGS. 12A and 12B are numerical examples of a fifth example of a database.

FIGS. 13A and 13B are numerical examples of a sixth example of a database.

FIGS. 14A and 14B are numerical examples of a seventh example of a database.

FIGS. 15A, 15B and 15C are numerical examples of an eighth example of a database.

FIG. 17 is a block diagram illustrating the configuration of an X-ray image transmission and reception system according to a third exemplary embodiment.

DESCRIPTION OF THE EMBODIMENTS

Various exemplary embodiments, features, and aspects of the invention will be described in detail below with reference to the drawings.

Figure 1:
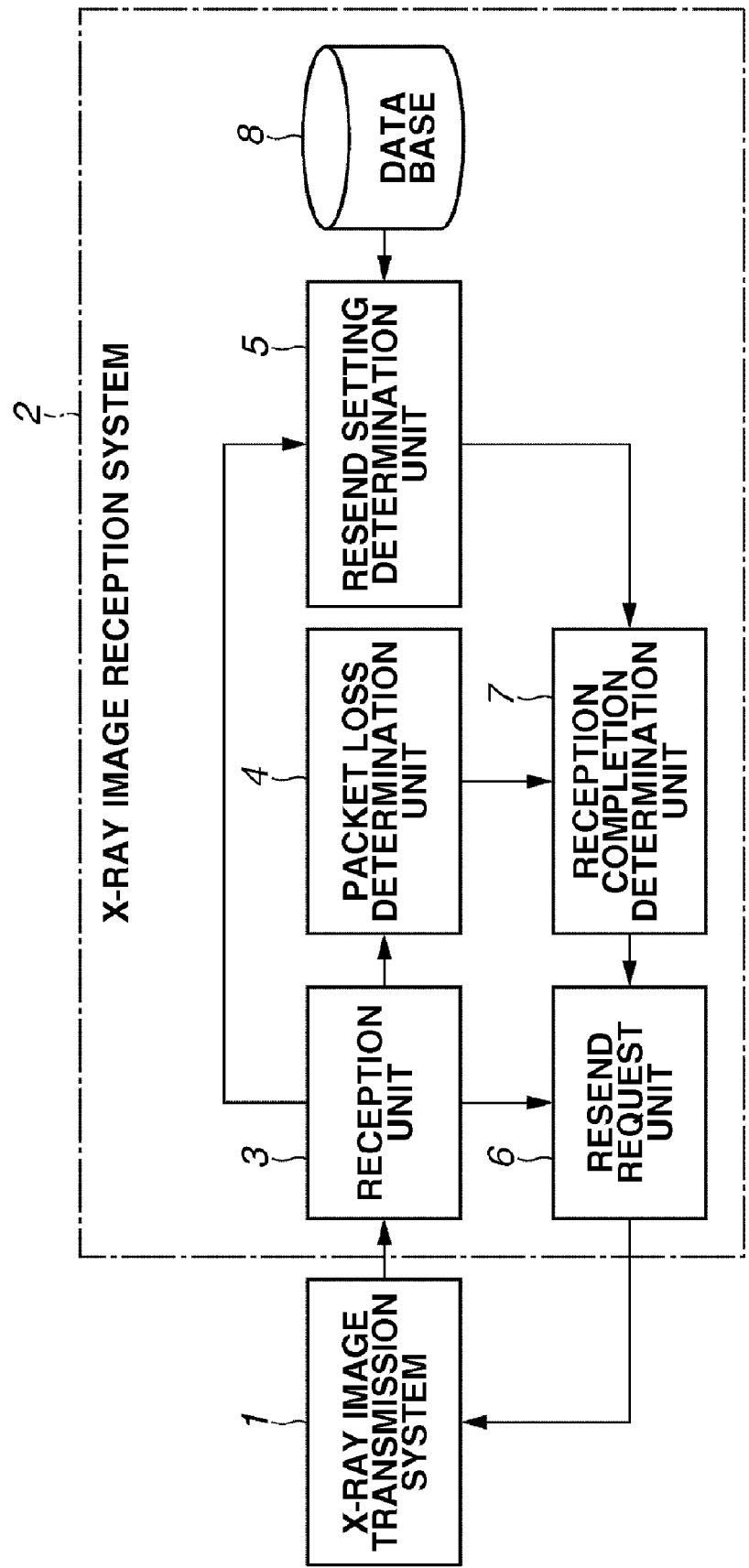
FIG. 1 is a block diagram illustrating the configuration of an X-ray image transmission and reception system according to a first exemplary embodiment.

FIG. 1 is a block diagram illustrating a circuit configuration of an X-ray image reception system including an X-ray image transmission system 1 including an X-ray fluoroscopic imaging apparatus and an X-ray image reception system 2 including an X-ray image display device according to a first exemplary embodiment. The X-ray image transmission system 1 and the X-ray image reception system 2 are connected via a packet communication network such as an Ethernet network.

The X-ray image transmission system 1 has a function of capturing images using an X-ray imaging device including an X-ray generating device and an X-ray detector, and sending the captured image together with additional information for the image to the X-ray image reception system 2.

The X-ray image reception system 2 has a reception unit 3 for receiving the image and additional information for the image sent from the X-ray image transmission system 1. A packet loss determination unit 4, which determines packet loss by monitoring the connectivity of packet numbers in the received packets, is connected to the reception unit 3.

In addition, a resend setting determination unit 5 for determining a resend setting and a resend request unit 6 are connected to the reception unit 3. A reception completion determination unit 7, which determines completion of reception based on acquired information, is connected to the packet loss determination unit 4, and to the resend request unit 6.

The resend setting determination unit 5 is connected to a database 8 and to the reception completion determination unit 7. The resend request unit 6 is connected to the X-ray image transmission system 1.

Upon receipt of an image and additional information for the image from the X-ray image transmission system 1, the reception unit 3 in the X-ray image reception system 2 sends the received additional information to the resend setting determination unit 5. The resend setting determination unit 5 determines the resend setting based on the additional information received by the reception unit 3 and system setting information acquired from the database 8, and transmits the result to the reception completion determination unit 7.

The packet loss determination unit 4 determines packet loss by monitoring the continuity or lack of continuity in the packet numbers of the packets received from the reception unit 3, and transmits the result to the reception completion determination unit 7.

The reception completion determination unit 7 sends the result to the resend request unit 6 based on the result of the packet loss determination unit 4 and the resend setting determination unit 5. The resend request unit 6 outputs a resend request to the X-ray image transmission system 1 based on the information from the reception unit 3 and the result determined by the reception completion determination unit 7.

Figure 2:
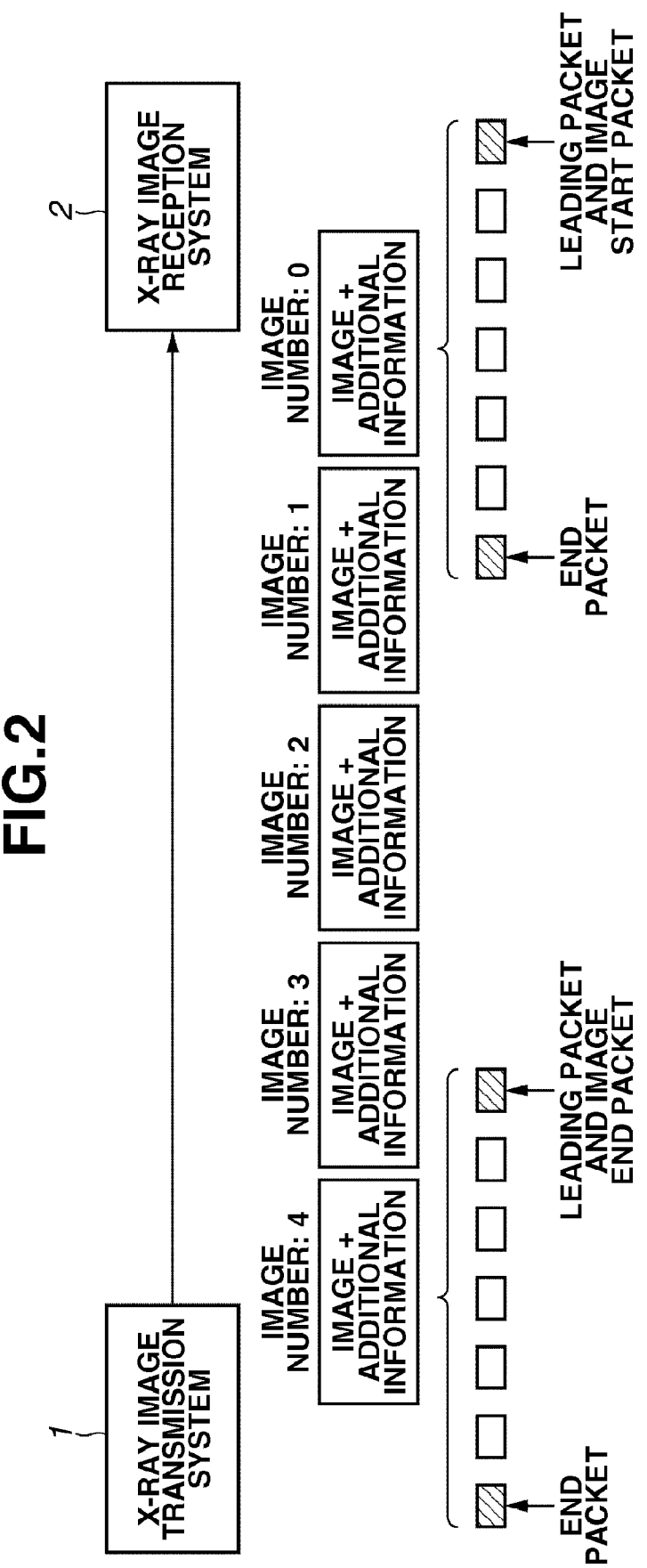
FIG. 2 illustrates a configuration of an image sent by packets and additional information to the image.

FIG. 2 illustrates images having image numbers 0-4 sent in packet format and additional information for the images. A single image is sent using a packet group divided into packets from a leading packet indicating the beginning of the image to an end packet indicating the end of the image.

An image start packet indicating the start of the image is included in the leading packet of the image captured first, which has an image number of 0, and is sent. An image end packet indicating the image end is included in the leading packet of the image captured last, which has an image number of 4, is sent.

Although the present exemplary embodiment describes an example configured as illustrated in FIG. 2, the image start packet may be sent separately before the transmission of the leading packet, which is captured first and has an image number of 0.

In the same manner, the image end packet may be sent separately before transmission of the leading packet of image number 4, which is captured last, or sent after the transmission of the end packet, or may be sent included in the end packet of the final image number 4.

Figure 3:
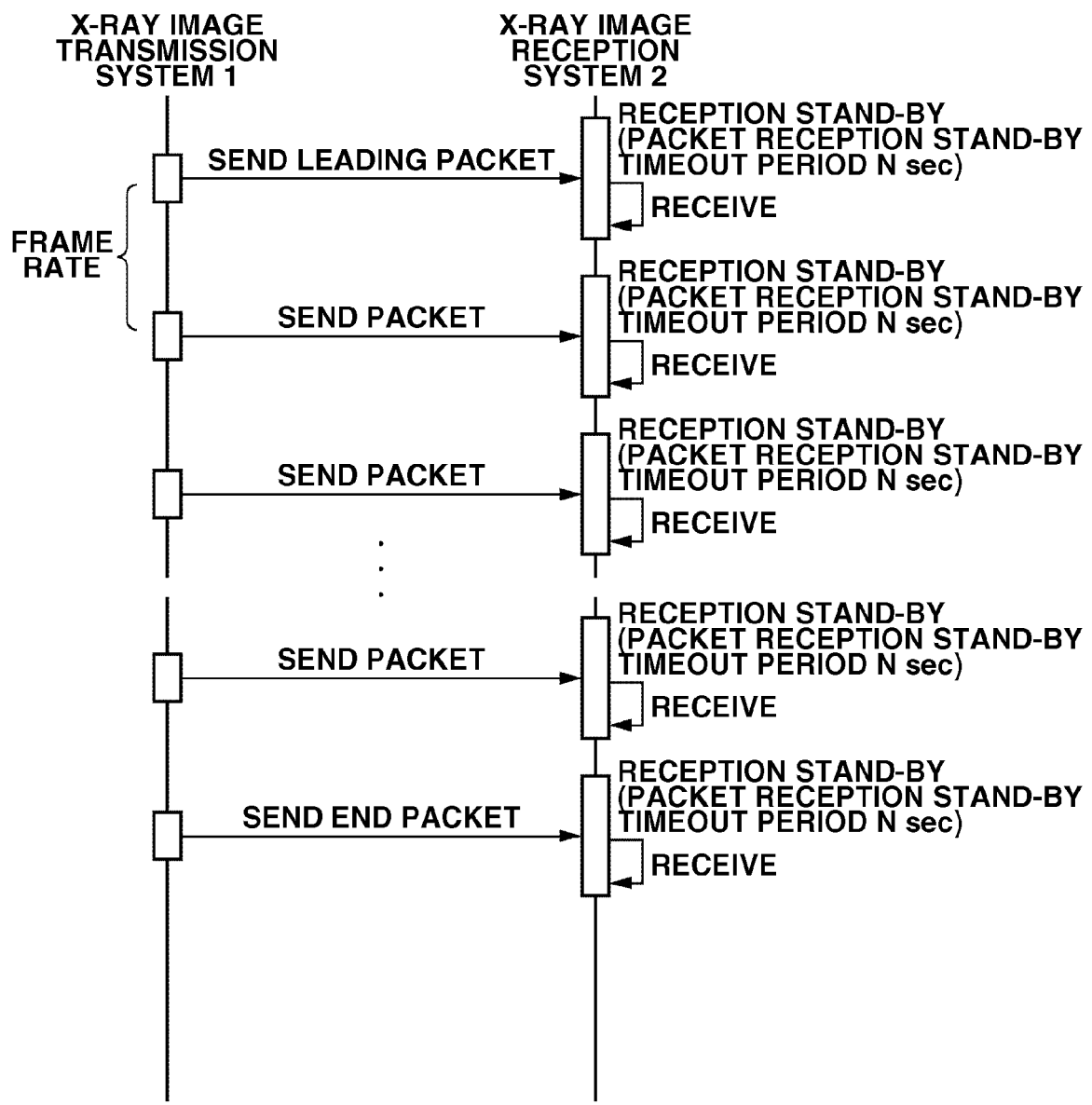
FIG. 3 illustrates a normal packet transmission and reception sequence.

FIG. 3 illustrates an example of a sequence having the above configuration. During reception standby, the X-ray image reception system 2 receives a continuous sequence of packets from the X-ray image transmission system 1. When reception is completed, the system 2 becomes resend reception standby state. Images and the additional information for images are received in sequence by repeating this process.

Figure 4:
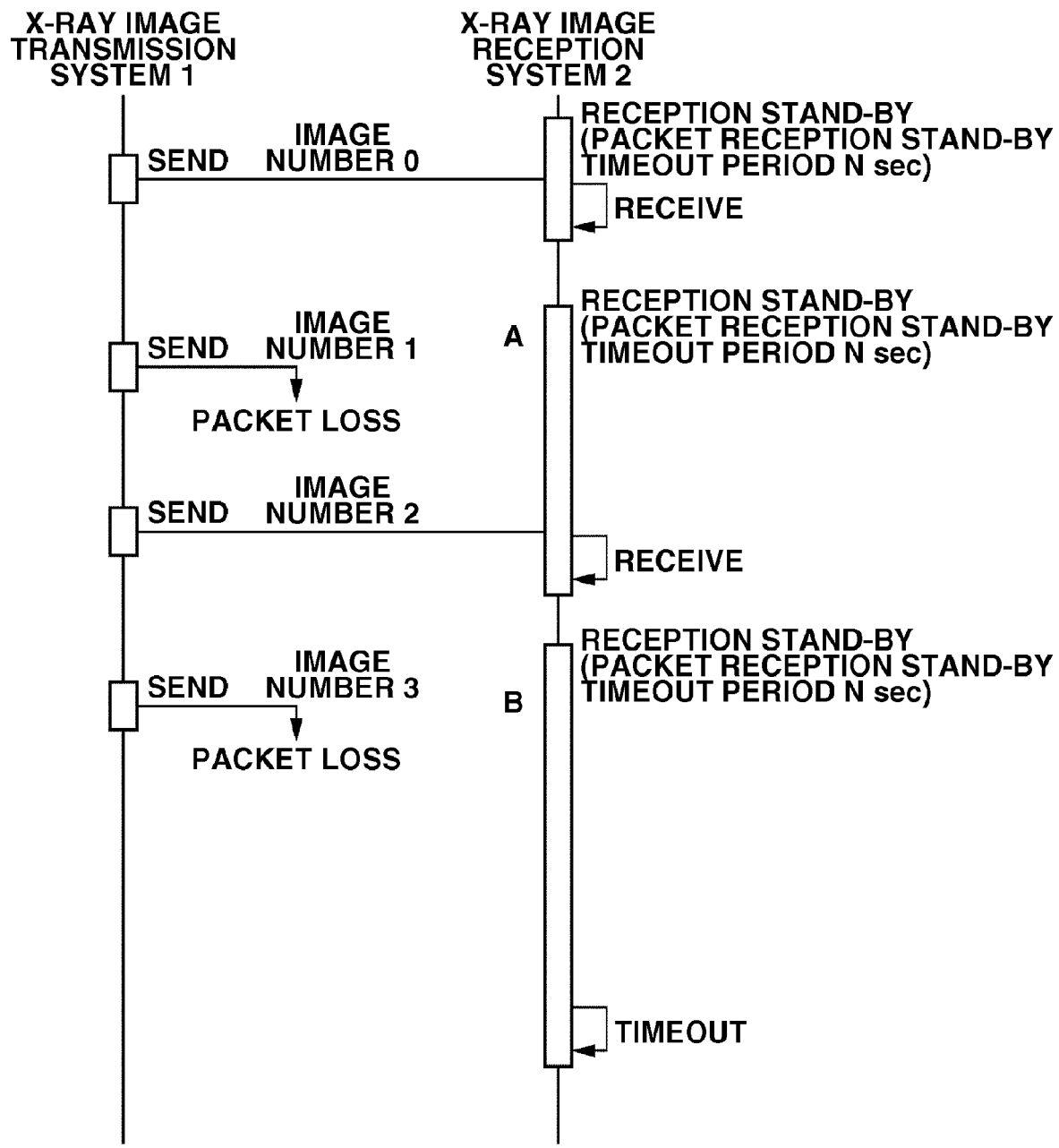
FIG. 4 illustrates a packet loss sequence.

FIG. 4 illustrates a sequence of operations in the event of packet loss during reception. In a state designated by "A", since a packet having the image number 1 has been lost, the X-ray image reception system 2 cannot receive the packet with the image number 1 and instead receives the packet with the image number 2, which is sent next.

Since the image numbers should be continuous, when the image number 2 is received in place if the image number 1, loss of image number 1 can be determined.

Furthermore, as shown in the state designated by "B", packet loss can be determined when a predetermined time period set as a packet reception standby timeout period has elapsed. In the present exemplary embodiment, although the packet reception standby timeout period has been set to N seconds, the packet reception standby timeout period can be suitably varied.

Figure 5:
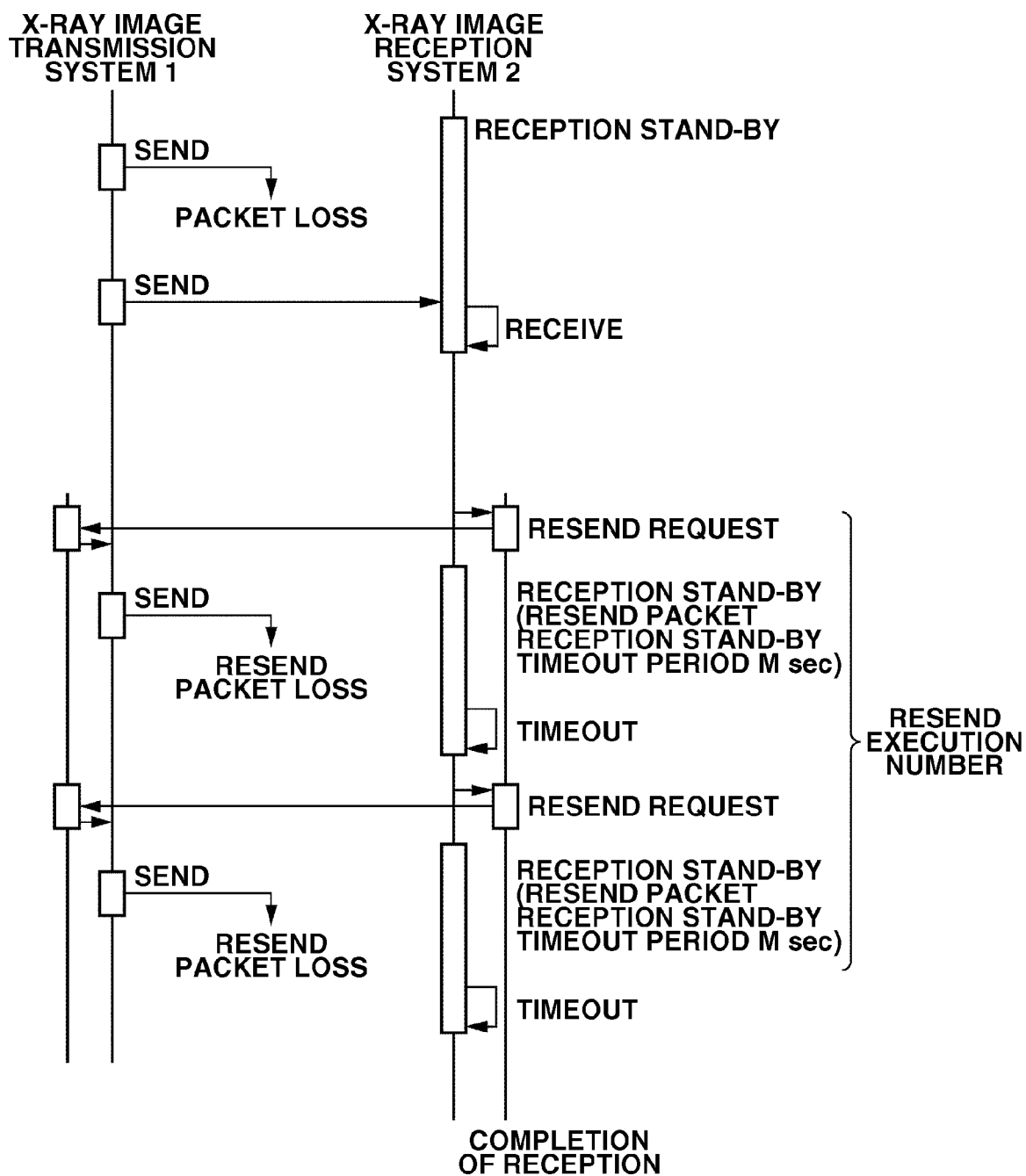
FIG. 5 illustrates the setting of a resend execution number.

FIG. 5 illustrates an example of a sequence of operations when a packet is lost during transmission and a resend request is generated. In this sequence, the resend execution is performed within 2 times. A resend setting is executed in the resend setting determination unit 5 described above in order to execute a resend request. The resend setting may include any of a resend execution number, resend execution time or resend request timing.

Figure 6:
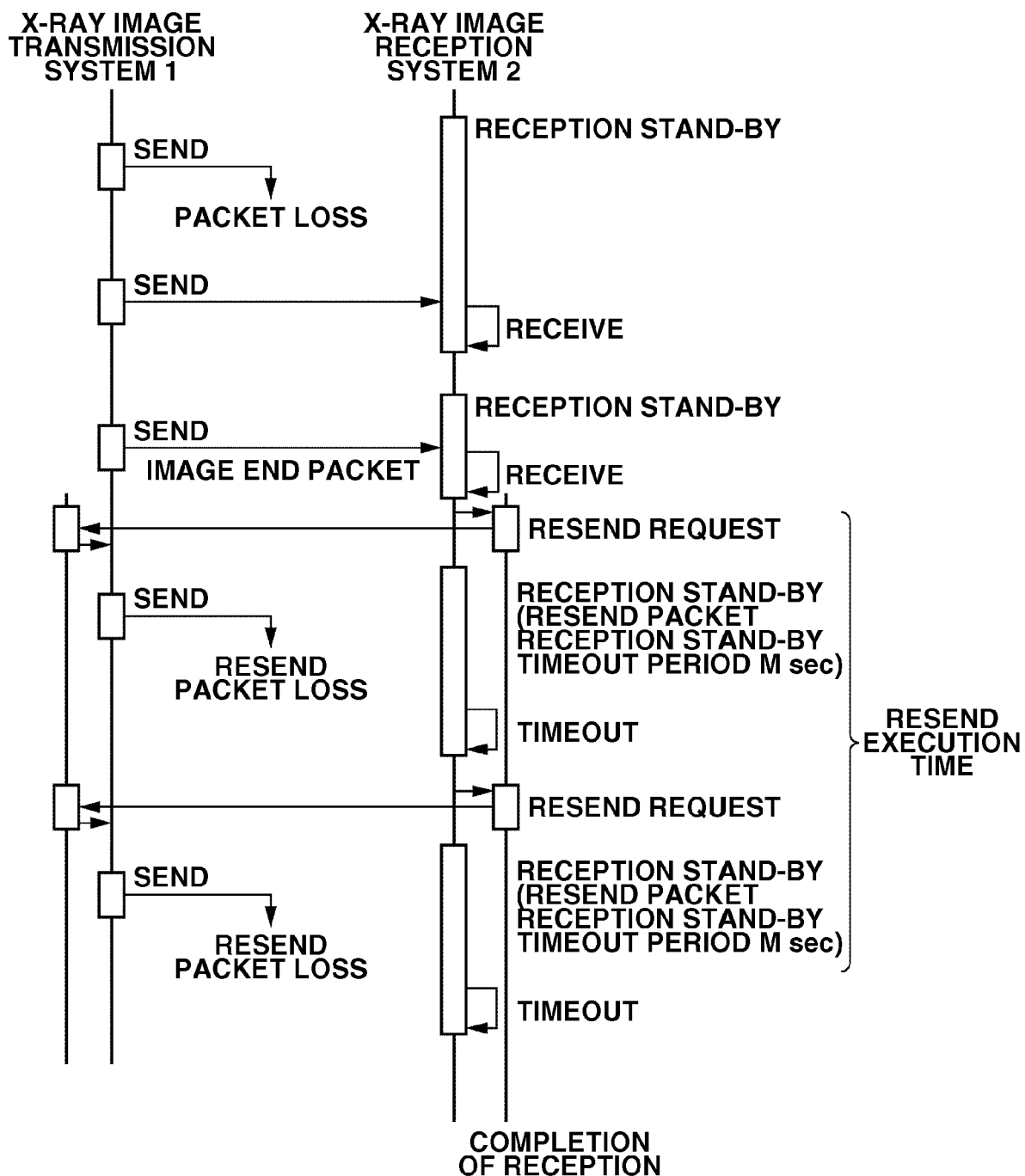
FIG. 6 illustrates the setting of a resend execution time.

The sequence of operations illustrated in FIG. 6 illustrates the setting of a resend execution time period in which resend request generation is enabled. The resend execution time terminates resending when the next leading packet has arrived. Therefore, the resend execution time should be set to a smaller value than the image frame rate illustrated in FIG. 3.

As described above, a resend packet reception standby timeout period is applied when waiting for a resend packet in the same manner as during normal packet reception. Furthermore, the resend request timing is set by applying a resend request when a plurality of resend requests are accumulated for a packet.

The resend request timing has been described above using an example of a packet number but may also be set using a time period.

Figure 7:
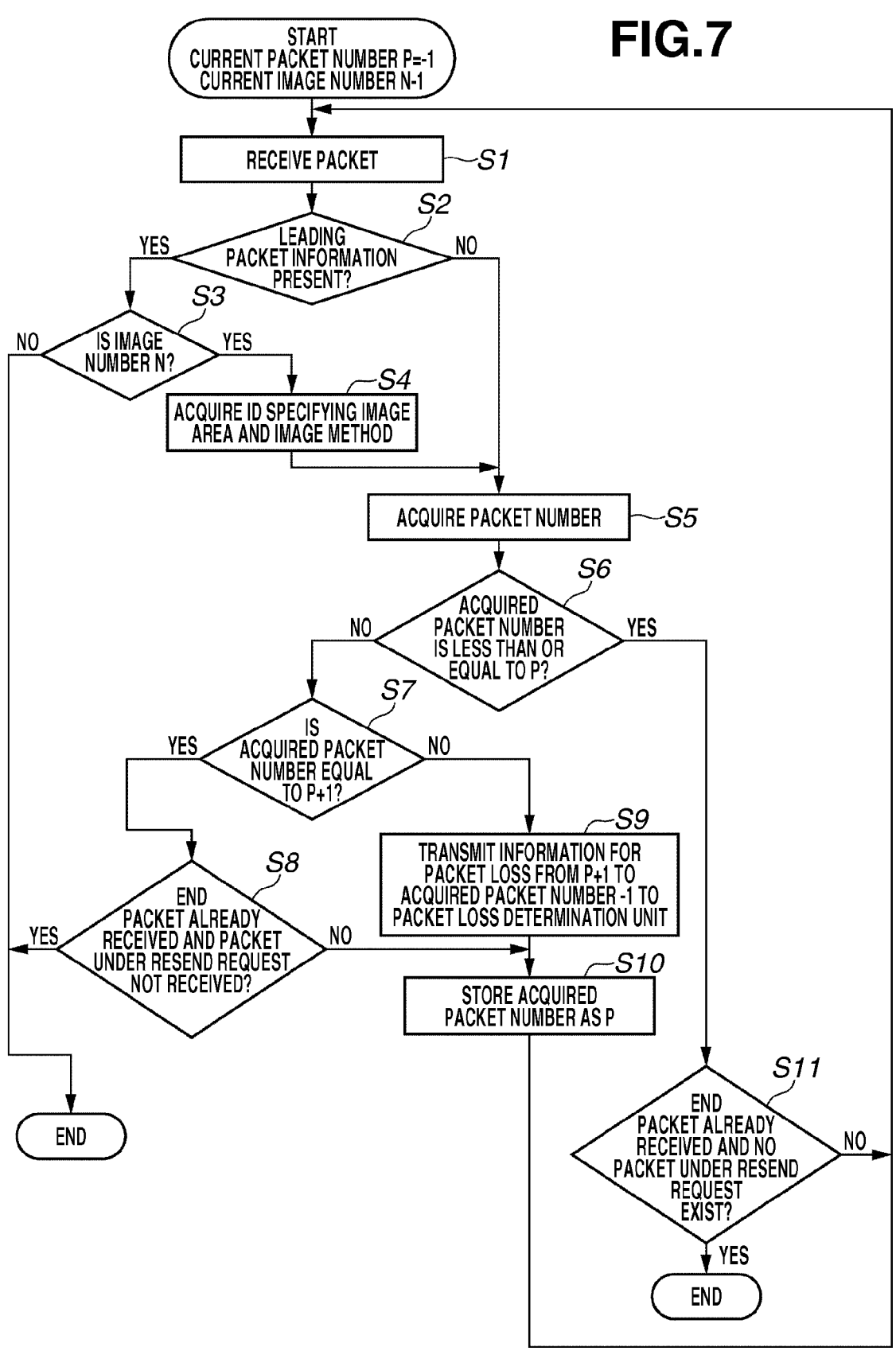
FIG. 7 is a flowchart illustrating an operation of an X-ray image reception system.

FIG. 7 is a flowchart illustrating the operation of the X-ray image reception system 2 configured as described above.

The initial settings for a packet number P and image number are respectively −1 and N−1. In step S1, a packet is received by the reception unit 3. Then in step S2, it is determined whether or not the received packet includes information for the header packet.

When the received packet includes header packet information (YES in step S2), the processing proceeds to step S3. When the received packet does not include header packet information (NO in step S2), the processing proceeds to step S5.

In step S3, it is determined whether or not the image number is equal to N. When the image number is N (YES in step S3), it is determined that the leading packet for the next image has arrived and the processing proceeds to step S4. In step S4, since additional information related to the image such as an ID specifying the various imaging areas and the imaging methods are stored in the leading packet, the ID specifying the imaging areas and the imaging methods is acquired, then the processing proceeds to step S5. In step S5, the packet number is acquired.

In step S6, it is determined whether or not the acquired packet number is less than or equal to "P". When the packet number is not less than or equal to "P", the packet is determined to be a new packet and not a resent packet (NO in step S6), then the processing proceeds to step S7.

In step S7, it is determined whether or not the acquired packet number is "P+1". When it is determined that the packet number is "P+1" (YES in step S6), it is determined that the packet is a new packet and there is no packet loss.

Then in step S8, when an end packet has not been received at this point or a packet is subject to a resend request (NO in step S8), the processing proceeds to step S10. In step S10, the acquired packet is set to P and the processing returns to step S1 and shifts to the next packet reception.

When a resend packet is received, since the packet number in step S6 is less than or equal to P (YES in step S6), the processing proceeds to step S11. When an end packet has not been received or there is no packet subject to a resend request (NO in step S11), the processing proceeds to packet reception in step S1.

When the above reception operation is repeated, the end packet has already been received and no packet is subject to a resend request, that is to say, when step S8 or step S11 are satisfied, the reception of the current image number is finished and the processing proceeds to reception of the next image.

When the leading packet for the next image number is received, since the image number in step S3 is N+1 (NO in step S3), the reception of the current image number is finished and the processing proceeds to reception of the next image.

When presence of packet loss is determined in step S7 (NO in step S7), the fact of the packet loss is transmitted to the packet loss determination unit 4 in step S9. In this manner, in step S9, since there is no resend setting, resend operation is performed using the initial system setting.

A state in which no packet is subject to a resend request as described above may correspond to any of (1)-(4) below.

(1) When originally there was no packet loss.
(2) When resend was completed after packet loss occurred.
(3) When resend processing was executed after packet loss occurrence, but the resend packet reception standby timeout period has elapsed and the set resend execution time has elapsed.
(4) When resend processing was executed after packet loss occurrence, but a resend packet reception standby timeout period has elapsed and the set resend execution number has been exceeded.

FIG. 8 is a first example of a database 8 for the resend setting determination unit 5. The resend execution number or the resend request timing is determined based on the characteristics of the imaging area.

For example, although high imaging frame rates is required for cardiovascular imaging, since the image fineness is not required, resend is not executed. On the other hand, since fine images are required for imaging of bone but a high frame rate is not required, the resend execution number is set to a high figure (for example 50 times) and the resend request timing is also set to a long interval, for example, for each 500 packets.

The resend settings for the resend execution number and the resend request timing acquired from the database 8 in FIG. 8 are transmitted to the reception completion determination unit 7. When the imaging area of the received image is assumed to be bone, for example, a resend request is generated by the resend request unit 6, when 500 packets have been accumulated, when a packet reception timeout period has elapsed, or when packet loss has occurred and an end packet has been received. Resending is then executed a maximum of 50 times until resending is successfully executed.

FIG. 9 is a second example of a database 8 for the X-ray image reception system 2. Irrespective of the imaging method ID, the resend request timing is fixed at 300 packets. When an image and the additional information for the image are received by the reception unit 3, the resend setting determination unit 5 extracts the imaging method ID from the image additional information and extracts a resend execution from the database 8.

The resend execution time is the time required for execution of a resend operation, that is to say, the period from the issue of the resend request to the reception of the resent packet, and is determined based on the characteristics of the imaging method.

For example, since fluoroscopy is an imaging method that executes moving image shooting using low-level X-ray irradiation, resending operations are not required since instantaneousness is most important and the data is not stored. However still image shooting uses high-level X-ray irradiation, and since the data is stored, the resend execution time is set to a large value.

The resend setting for the resend execution number and the resend request timing acquired from the database 8 as illustrated in FIG. 9 is transmitted to the reception completion determination unit 7.

When the imaging method of the received image is assumed to be cineradiography for example, a resend request is generated by the resend request unit 6 in any of the following situations (5)-(7) and resending is performed for 1000 ms until successful resending is executed.

(5) When 500 packets have been accumulated.
(6) When a packet reception timeout period has elapsed.
(7) When an end packet has been received.

FIGS. 10A and 10B illustrate a third example of a database 8 for the X-ray image reception system 2. This example is more detailed than the example 2 described above. More specifically, resend operations are executed separately for each packet number.

For example, since the leading packet in the packets contains additional information for the image and is necessary for determination of the resend setting, the resend timing is set to be immediate and the resend execution is set to a large value. Although a leading packet is exemplified in the description above, the setting operation can be made by using other packet or an end packet.

FIGS. 11A and 11B illustrate a fourth example of a database 8 for the X-ray image reception system 2. In this example, a resend execution number is determined using the image automatic storage setting information and the image automatic printing setting information.

For example, since both printing and storage during fluoroscopy have a value of 0, that is, these operations are not required, the resend execution number is set to 0. However, since both printing and storage are performed for still images, the importance of resending is high and the execution number is set to 30.

Although in the example described above, the database 8 has information such as image automatic printing setting or the like, using an imaging method ID as a key. However, a system setting for information such as the image automatic printing setting may be provided as a system setting, and as illustrated by a fifth example of a database 8 in FIGS. 12A and 12B, resending setting can be performed by combining the imaging method ID and the image automatic printing setting together as a key.

Although this example discusses image automatic printing storage information and image automatic printing setting information, similar results can be obtained when using image automatic transmission setting information.

FIGS. 13A and 13B illustrate a sixth example of a database 8 for the X-ray image reception system 2. In this example, when using fluoroscopy or the like, the final captured image is termed a "last image hold", is used for diagnosis, and is stored. Consequently the resend execution number for the last captured image, which is indicated by sending the image end packet when imaging is finished, is set to a large value.

FIGS. 14A and 19B illustrate a seventh example of a database 8 for the X-ray image reception system 2. In this example, when using DSA or ROADMAP imaging, since the first three images, for example, may be used for the mask image, the resend execution number for the images to be used as the mask image is set to a large number.

Resend settings are also possible as shown in the eighth example illustrated in FIGS. 15A, 15B and 15C, which combines the resend settings of the first to the seventh examples above.

Figure 16:
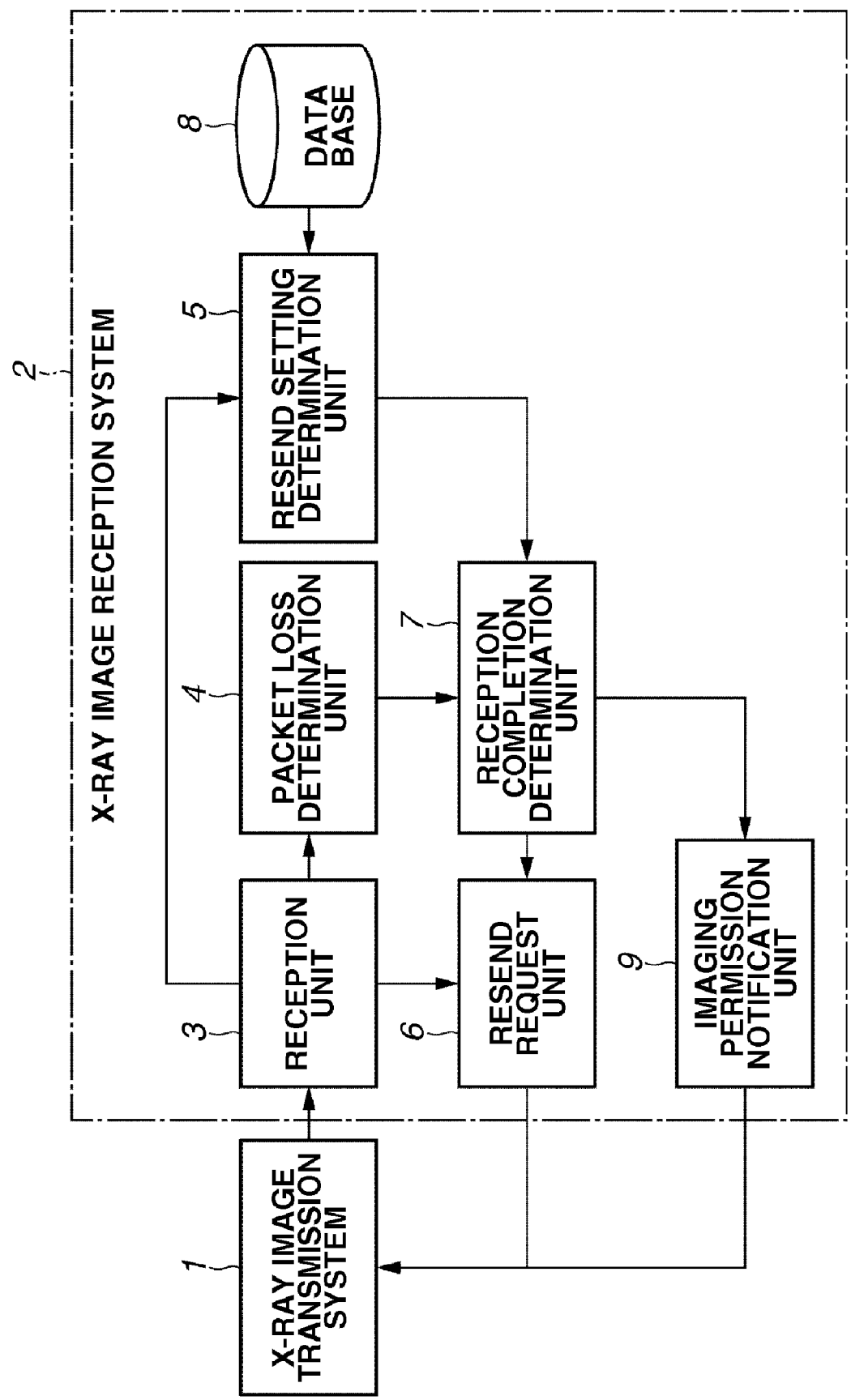
FIG. 16 is a block diagram illustrating the configuration of an X-ray image transmission and reception system according to a second exemplary embodiment.

FIG. 16 is a block circuit diagram according to a second exemplary embodiment. In contrast to FIG. 1 illustrating the first exemplary embodiment, the output of the reception completion determination unit 7 of the X-ray image reception system 2 is connected to the X-ray image transmission system 1 through an imaging permission notification unit 9 in the reception system 2.

The resend setting determination unit 5 determines resend settings based on information acquired from the database 8 and the additional information as described above, and transmits the result to the reception completion determination unit 7. On the other hand, the packet loss determination unit 4 determines packet loss by monitoring the continuity of the packet numbers received from the reception unit 3, and transmits the result to the reception completion determination unit 7.

The resend request unit 6 acquires information from the resend setting determination unit 5 and the packet loss determination unit 4, and executes a resend request to the X-ray image transmission system 1 based on the acquired information. When completion of reception is determined by the reception completion determination unit 7, the imaging permission notification unit 9 is notified of the reception completion information and imaging permission information is sent to the X-ray image transmission system 1.

FIG. 17 is a block circuit diagram according to a third exemplary embodiment. In contrast to FIG. 1 illustrating the first exemplary embodiment, the output of the reception completion determination unit 7 in the X-ray image reception system 2 is connected to the reception unit 3 via an image output control unit 10.

When the reception unit 3 receives an end packet, then the end packet is transmitted to the image output control unit 10. The image output control unit 10 displays an image. On the other hand, when completion of reception is determined by the reception completion determination unit 7, the reception completion determination unit 7 is notified of the reception completion information and performs image storage, image transfer, and image printing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-257313 filed Oct. 2, 2008, which is hereby incorporated by reference herein in its entirety.

What is claimed is:

1. An X-ray fluoroscopic imaging apparatus, in which an X-ray imaging device including an X-ray image transmission system is connected with an X-ray image display device having an X-ray image reception system via a packet communication network, capable of imaging at a plurality of imaging areas and imaging using a plurality of imaging methods, the X-ray image reception system comprising:

a reception unit configured to receive an image and additional information for the image, which are sent in packets;

a packet loss determination unit configured to determine packet loss in the image or in the additional information for the image;

a resend setting determination unit configured to determine a resend setting based on the additional information for the image and system setting information for the image;

a reception completion determination unit configured to determine reception completion of the image and the additional information for the image based on information from the packet loss determination unit and the resend setting determination unit; and a resend request unit configured to perform resend requests until a notification is received from the reception completion determination unit.

2. The X-ray fluoroscopic imaging apparatus according to claim 1, wherein the additional information for the image includes at least one of an ID and image number specifying an imaging area and an imaging method for each image and contained in a leading packet of the image, a packet number attached to each packet, a leading packet at a beginning of the image, an end packet at an end of the image, an image start packet sent with the leading packet or sent before a first captured image, and an image end packet sent before sending or after sending a last captured image at completion of imaging, or together with the leading packet of the last captured image, or together with the end packet of the last captured image.

3. The X-ray fluoroscopic imaging apparatus according to claim 1, wherein the resend setting includes at least one of a resend request time period, a resend execution number, and a resend request timing for requesting resend to the X-ray image transmission system.

4. The X-ray fluoroscopic imaging apparatus according to claim 1, wherein the resend setting determination unit determines a resend setting based on additional information for the image and any of image automatic transfer setting information, image automatic printing setting information, and image automatic storage setting information, which is system setting information for the image.

5. The X-ray fluoroscopic imaging apparatus according to claim 4, wherein the system setting information for the image, and image automatic transfer setting information, image automatic printing setting information and image automatic transmission setting information are provided for each imaging area and imaging method.

6. The X-ray fluoroscopic imaging apparatus according to claim 2, wherein the packet loss determination unit performs a determination operation by monitoring lack of continuity in packet numbers contained in each packet or by monitoring a packet reception standby timeout.

7. The X-ray fluoroscopic imaging apparatus according to claim 3, wherein the resend request timing is set to be at least one of when a predetermined number of packets are received, when the end packet is received, and when a packet reception standby timeout period is elapsed.

8. The X-ray fluoroscopic imaging apparatus according to claim 2, wherein when the leading packet is lost, an initial resend setting is used until the leading packet is received.

9. The X-ray fluoroscopic imaging apparatus according to claim 3, wherein when the leading packet is lost, at least one of the resend execution time period is increased, the resend execution number is increased, and the resend request timing is made earlier.

10. The X-ray fluoroscopic imaging apparatus according to claim 3, wherein the reception completion determination unit determines completion of reception when at least one of there is no packet loss, resend after occurrence of packet loss is completed, a set resend execution time period has elapsed, resend has been performed up to the set resend execution number, and the leading packet for the next image has been received.

11. The X-ray fluoroscopic imaging apparatus according to claim 2, wherein when the end packet is received, image display is started, and image storage, image transfer, and image printing are performed at the reception completion timing by the reception completion determination unit.

12. An X-ray image reception apparatus comprising:
a reception unit configured to receive an image and additional information for the image, which are sent in packets;
a packet loss determination unit configured to determine packet loss in the image or in the additional information for the image;
a resend setting determination unit configured to determine a resend setting based on the additional information for the image;
a reception completion determination unit configured to determine reception completion of the image and the additional information for the image based on information from the packet loss determination unit and the resend setting determination unit; and
a resend request unit configured to perform resend requests until a notification is received from the reception completion determination unit.

* * * * *